J. GOOD.
METHOD OF OPERATING INTERNAL COMBUSTION ENGINES.
APPLICATION FILED NOV. 6, 1919.
1,377,989.
Patented May 10, 1921.
3 SHEETS—SHEET 1.
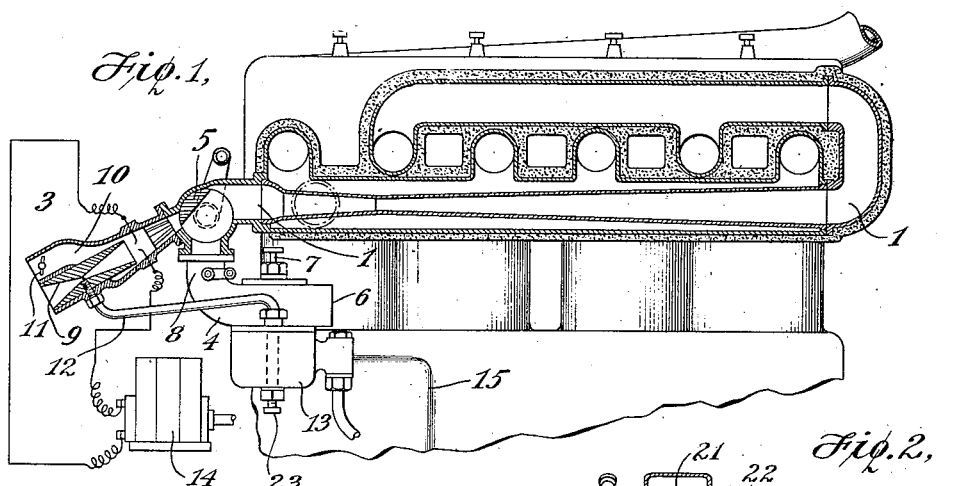
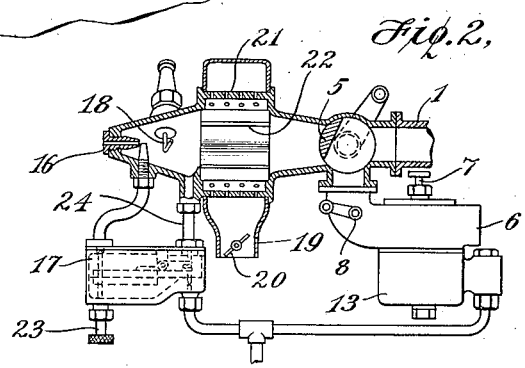
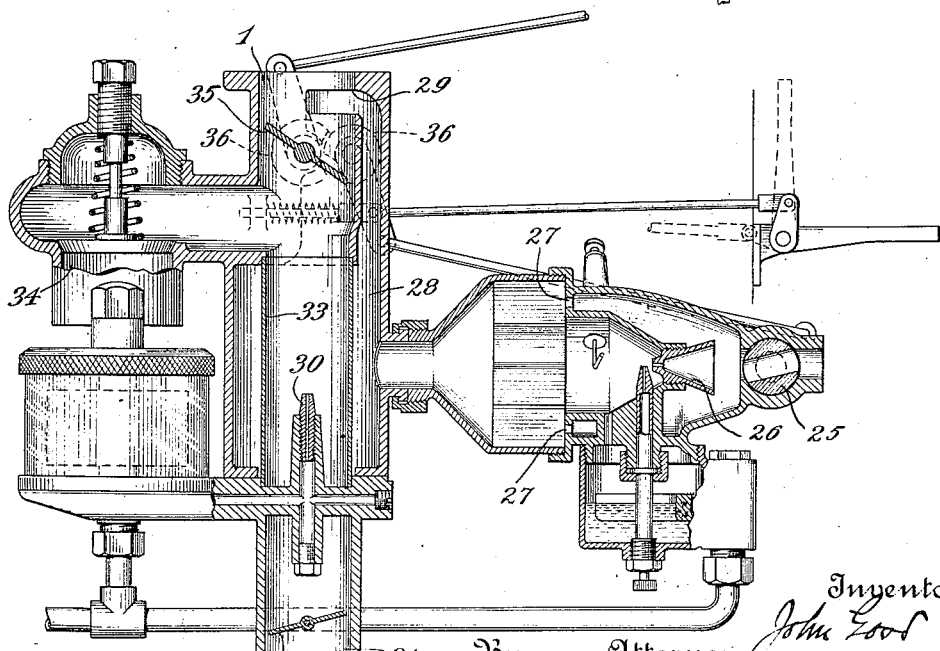

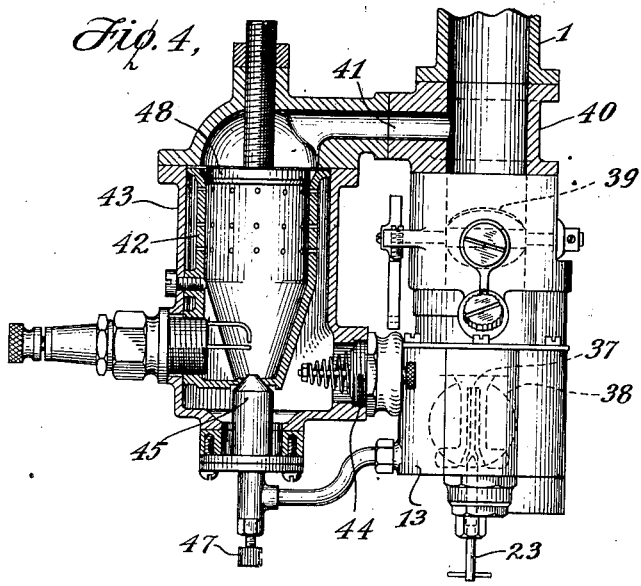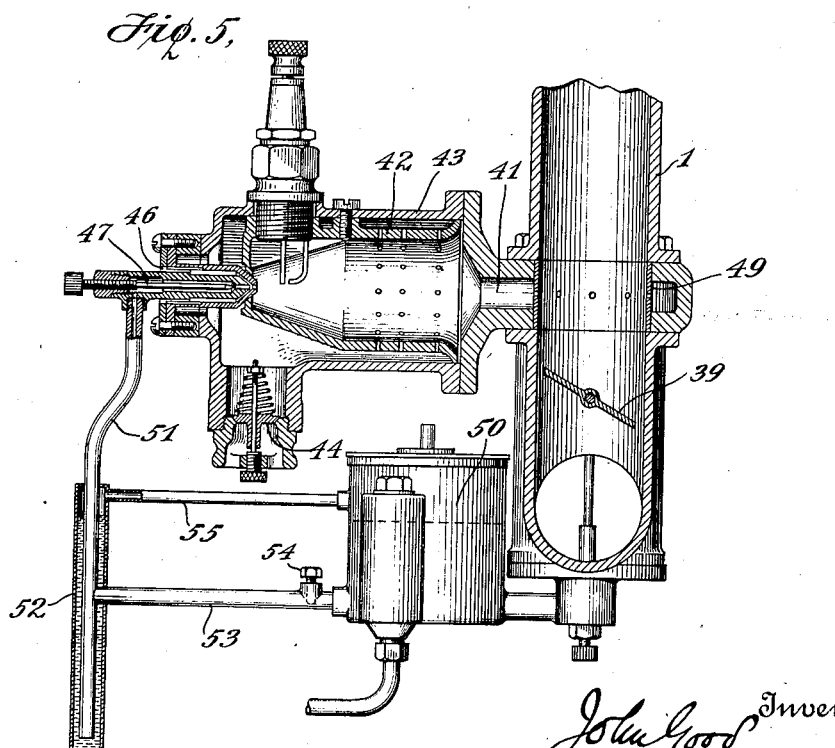

J. GOOD.
METHOD OF OPERATING INTERNAL COMBUSTION ENGINES.
APPLICATION FILED NOV. 6, 1919.

1,377,989.

Patented May 10, 1921.
3 SHEETS—SHEET 3.

Inventor
John Good
By
Attorney

UNITED STATES PATENT OFFICE.

JOHN GOOD, OF BROOKLYN, NEW YORK, ASSIGNOR TO GOOD INVENTIONS CO., OF NEW YORK, N. Y., A CORPORATION OF NEW YORK.

METHOD OF OPERATING INTERNAL-COMBUSTION ENGINES.

1,377,989.  Specification of Letters Patent.  Patented May 10, 1921.

Application filed November 6, 1919. Serial No. 336,027.

*To all whom it may concern:*

Be it known that I, JOHN GOOD, a citizen of the United States, residing in the borough of Brooklyn, county of Kings, and State of New York, have invented certain new and useful Improvements in Methods of Operating Internal-Combustion Engines, of which the following is a specification.

The invention provides a method of operating internal combustion engines on low grade gasolene, kerosene and like relatively non-inflammable motor fuels enabling them to start instantly in cold weather on such fuels and run efficiently and smoothly thereon and providing other incidental advantages as will be herein made apparent.

The method consists in utilizing the suction effect of the rotating engine to draw into its intake apparatus two mixtures of liquid fuel and air, igniting one of these mixtures, maintaining it in combustion and leading the flame or flame products into the path of and commingling it with the other mixture in its passage to the engine combustion space where the resulting medium performs work by internal combustion and expansion. As will hereinafter appear, the method can be performed in various ways and by means of widely different forms of apparatus several of which are herein illustrated.

Figure 1 represents a longitudinal section through an intake manifold connected to apparatus by means of which the invention may be practised.

Fig. 2 shows a different form of such apparatus.

Fig. 3 another mode of combining ignited and unignited mixtures.

Fig. 4 illustrates a particular method of controlling the manner of combustion of the ignited mixture.

Fig. 5 a different method of control of the ignited mixture.

Figure 6:
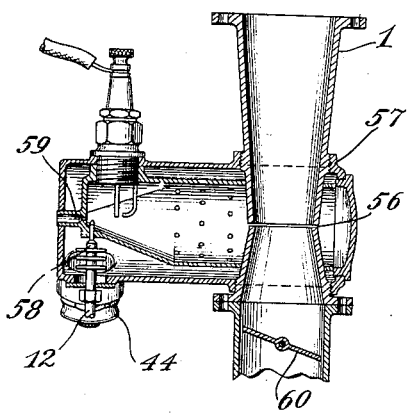

Fig. 6 still a different method of admission.

Figure 7:
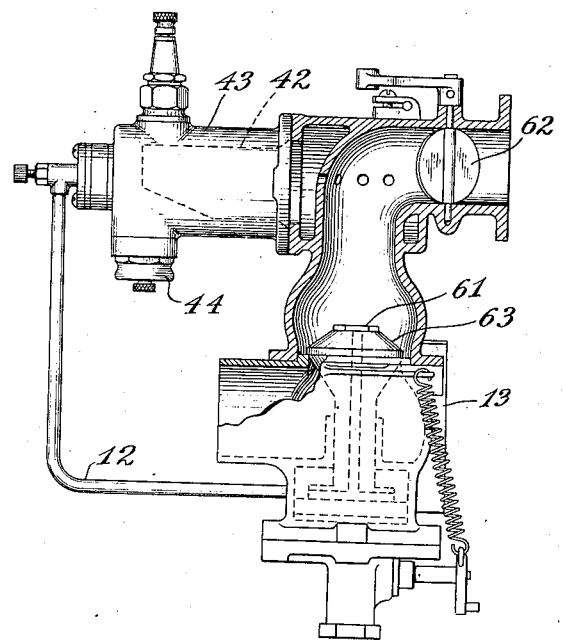
Figure 8:
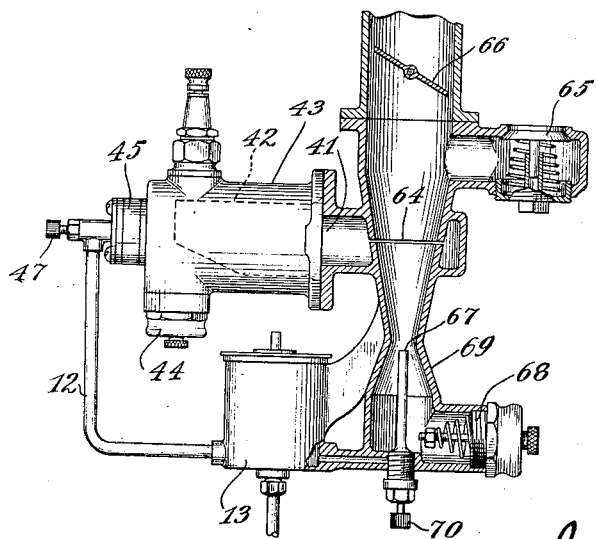

Fig. 7. illustrates the admission of the ignited mixture to the unignited mixture outside the throttle and Fig. 8 illustrates such admission as made close to the point of formation of the unignited mixture.

Referring first to Fig. 1, reference numeral 1 represents the intake manifold of an ordinary four cylinder engine which is exhaust heated and connected by an adapter fitting to the suction operated combustion device 3 which provides the ignited mixture and also to a carbureter device 4. which provides the unignited mixture. A rotary valve 5 serves to connect either one or both devices with the intake, and also serves to vary the cross area of the communicating connection therewith. The carbureter device may be understood to represent any ordinary carbureter commonly used on automobile engines and consists essentially of a fuel jet and air passage operated by the suction of the intake to produce a spray mixture of fuel and air in substantially explosive proportions. The detail operation of such devices is well known and need not be further described. The entrance to the air passage is marked 6, the regulating screw valve 7 and the throttle 8. The combustion device 3 consists of a casing containing a Venturi tube 9 and an air passage 10 having a damper 11 the position of which controls the relative flows of air through the passage and the Venturi tube. The latter contains a fuel jet or fuel inlet at its throat supplied with fuel liquid by pipe 12 from the float bowl 13 of the carbureter, so that both devices operate on fuel from the same source. The air flow through the venturi, produced by the suction of the engine, causes delivery of fuel liquid from the fuel jet and a discharge of a finely atomized fuel spray from the inner end of the Venturi tube, which spray on emerging from the tube is immediately surrounded by an envelop of air flowing in from the passage 10. A spark between the electrodes of the magneto circuit 14 is used to ignite the spray before it has homogeneously mixed with the surrounding air envelop, *i. e.*, to ignite it at a relatively rich spot in the mixture. In this position the mixture is capable of ignition cold, *i. e.*, without preheating or vaporizing it, and in the case in hand the proportion of air and fuel in the mixture are desirably those which produce substantially complete combustion.

In operating an engine equipped with apparatus such as just described or its equivalent according to this invention, the engine is rotated by the starting motor indicated at 15 or by hand crank, which develops a certain suction in the intake 1. By the appropriate setting of valve 5 and the throttle 8 the suction effect is extended to and allowed to act coincidently on the two mixture producing devices, i. e., on the carbureter and the suction burner 3. Coincidently with the creation of a mixture in the latter device it is ignited, electrically and automatically, and combustion thereof ensues. By reason of the special manner of introducing the spray and air in said device 3, such combustion is non-explosive and it is likewise continuous so long as a predetermined suction effect is maintained. The flame or flame products are then drawn directly into the intake past the valve 5, and directly into contact with the mixture created by and flowing from the carbureter. The commingled mixtures thereupon flow together through the intake to the engine cylinders. By thus creating ignited and unignited mixtures and admitting the one to the other, very prompt vaporization or gasification of some of the fuel in the unignited mixture is obtained, which passing to the engine cylinders renders the charge therein readily ignitible by the usual engine spark even though the engine is very cold, thus making possible an instant start in cold weather, or on low grade fuels. When the engine picks up on this charge medium it then continues the suction effect independently of the starting motor, and hence continues the action of the two mixture-producing devices and when so running the presence of the burner products exerts an effect on the carbureter mixture which not only enhances its ignitibility but also improves the action of the engine under load, making it more flexible in control and eliminating the tendency to knock at full cylinder charges, especially where the fuel is kerosene. Inasmuch as the occurrence of the knock is the principal obstacle to the use of high compression pressures in engines designed for low gravity fuels, it may be noted that the admission of burner products thus permits the use of such compressions with a corresponding gain in efficiency when using fuels of the kind mentioned. It may be noted here, also, that the contact and commingling of the actual flame of the burner with the carbureter mixture does not inflame the latter and quicker starting results are generally obtained by letting the flame extend for some distance into the intake in direct contact with the carbureter mixture. This may be done by making the flame space in the suction burner relatively short and the connection to the intake direct and unobstructed. At the point or region of such contact the said carbureter mixture may be already fully proportioned, that is to say, it may at that point contain the full proportions of fuel and air suiting it for explosive combustion, or it may contain other proportions so as to require the addition of more air, or more fuel before its entrance to or ignition in the engine as later explained. The limits of proportions of the burner mixture are controlled by the conditions permitting electric ignition and combustion and may be varied accordingly. The burner may, for example, be made overrich for ignition purposes and thereafter run according to the requirements of complete combustion as later explained. The combustion actually occurring, when the proportions are those demanded for complete combustion, may not be complete however depending on the manner of treatment of the flame; that is to say, the velocity effect through the outlet of the burner may be such that a flame otherwise adapted to burn with complete combustion is extinguished by the velocity effect through the (restricted) outlet formed by the partially opened valve 5 before all the hydrocarbons therein have had opportunity to combine with the oxygen therein in the chemical reaction constituting combustion. In such cases the general effect is the same as already described, of delivering abundant heat to the carbureter mixture to render the latter instantly and readily combustible as above explained but the remaining unburned fuel in the burner products is itself an explosive medium, and is now added to the carbureter mixture.

A generally similar though specifically different effect may be obtained by running the burner over-rich with fuel so that all the fuel does not burn prior to contact with the unignited mixture. This type of incomplete or imperfect combustion produces heat as before but the resulting burner products are not of themselves a properly explosive medium, as explained below, the addition of air being necessary to make them so. These methods of control of the combustion in the suction burner above described represent different forms of my broad invention which is characterized by the commingling of ignited and unignited mixtures of fuel and air and their proper control to the end of obtaining prompt starting and efficient running of engines on low grade fuels irrespective of temperature conditions.

The succeeding figures of the drawing illustrate the means whereby such methods may likewise be carried out.

Fig. 2 illustrates a suction burner of different form but adapted to the same general purposes as the burner 3 in Fig. 1. The intake suction induces an air jet at the nozzle 16 which aspirates fuel liquid from the float 17 and creates a spray relatively rich at the spark location 18 where it is ignited. Air for burner combustion enters at 19 under control of the damper 20 and passes through the ring of distributing holes 21 where it joins the ignited spray in the spaces between a set of longitudinal ribs or vanes 22 mounted within the ring of holes. The flame so produced, or its flame products, is drawn into the intake as above described. The delivery of fuel to the air jet is regulated by the screw valve 23. The passage 24 represents a combined drain and pressure-equalizing port. The structures shown in Figs. 1 and 2 are identical with the apparatus shown and claimed in my copending application Serial No. 101889, filed June 6, 1916.

In Fig. 3 the suction burner is constructed on the same principle as in Fig. 2 but is controlled by an anterior valve 25 which may be used to vary the burner operation or extinguish it at any point desired. The air passing this valve, under the engine's suction divides, part serving to form the aspirating air jet at nozzle 26 and the remainder passing through the holes 27 to support the burner combustion. The resulting mixture is ignited as before and the flame is drawn through the space 28 in the carbureter and thence into the intake passage (1) at the opening 29 where it mingles with the spray produced by the carbureter spray nozzle 30 and with the air which enters the carbureter through the primary air entrance 31 (under the control of the choker 32) and the secondary entrance 34. This apparatus is shown and claimed in my copending application Serial No. 149998, filed February 21, 1917, and illustrates one manner of commingling ignited and unignited spray mixtures according to this invention, but in such a way as to utilize some of the heat of the former for surface vaporization of the liquid fuel within the carbureter. Other forms of apparatus can obviously be employed for the same purpose. The thin shell wall 33 which separates the spray zone of the carbureter from the flame passage 28 becomes highly heated and thereby facilitates the general vaporization by contact of the spray thereon as well as by radiation. The auxiliary or secondary air supply entering the carbureter at 34 makes the mixture fully proportioned before it encounters the flame or burner products emerging at 29. This particular figure also includes an interlocking control between the engine throttle 35 and the burner control valve 25, represented by the cut-out disks 36 shown in dotted lines. These are so arranged in this particular case that the burner must be extinguished before the throttle can be opened beyond some predetermined point, representing the point where assistance to vaporization of the burner is not desired. This also requires the throttle to be set to a closed or idling position before the burner valve can be opened; but obviously such interlock is by no means necessary.

Fig. 4 represents a suitable form of apparatus by means of which the flame of the suction burner can be controlled so as to mix burner products containing a portion of unburned or uncombined burner mixture with the carbureter mixture as above mentioned. In this figure the carbureter comprises the usual fuel jet 37, air inlet 38 and throttle 39, as will be recognized by the dotted lines (this being a well known carbureter), and is connected to the intake 1 by an adapter 40 to which the outlet passage 41 from the suction burner is also connected. The burner itself comprises an air distributing shell 42 within an outside casing 43 having a spring-seated air valve 44 adapted to be opened by the air inflowing under the suction effect. Such air flows around the shell and through the perforations therein. An atomizing fuel spray nozzle 45 (see Fig. 5) enters the center of the shell and is adapted to deliver an air-atomized spray upwardly and centrally of the shell. The air for atomizing this spray enters the nozzle through the air holes 46 therein (see Fig. 5) and the fuel liquid through the central hole controlled by needle valve 47 from a tube connecting with the fuel receptacle of the carbureter. A spark plug is located in the shell wall in position to ignite the spray where the mixture is relatively rich in fuel, and by this means a flame is established within the shell, the proportions of fuel and air being regulated according to the requirements of complete combustion. A disk throttle 48 adjustably mounted, as indicated, forms with the shell an annular crevice and is so related to the source of the spray as to cut off or extinguish the flame by the high velocity effect past the disk, and before all of the hydrocarbon in the mixture has combined with the oxygen therein, as above explained, with the result that a partially burned mixture is produced, which passes through the outlet 41 and is there commingled with the carbureter mixture, heating it and adding its power value thereto, as stated above, and also reducing the tendency to knock. By changing the location of the flame-restricting crevice with respect to the spray nozzle the amount of partially burned mixture thus produced may be varied and it may be produced in such quantity as not to require the immediate use of the mixture from the carbureter, that is to say, the engine may be cranked over with the carbureter completely shut off and started and run for the initial warming up period or even longer solely on the partially burned mixture produced in this way, the carbureter mixture being added later as demanded by the load conditions. I prefer, however, that the two mixtures shall be produced simultaneously and be commingled at the outset because the engine spark will readily ignite such a commingled medium and full power is thus more quickly available.

Fig. 5 illustrates a means for more thoroughly commingling the two mixtures, the burner mixture entering the other mixture in this case through the ring of holes in the adapter sleeve 49, and this figure also illustrates another practical means of controlling the character of the combustion in the burner. The fuel supply line from the carbureter receptacle 50 comprises the tube 51 extending into a well 52 of liquid fuel connected by tube 53 with the receptacle 50. The tube 53 is restricted by a set screw 54 tapped transversely into its bore, and when the engine is still, liquid flowing past the restriction will establish a liquid level in the well even with that in the receptacle and as roughly indicated by the dotted line. When the engine is rotated to create suction in the intake, the spray nozzle will draw up liquid from the well at first freely and then with a diminishing rate due to the falling level in the well and at a certain point the liquid in the well reaches a fixed level determined by the rate of inflow permitted by the restriction 54, under which condition fuel delivery to the burner is substantially constant and the proportions are those which conform to the requirements of complete combustion. The effect of this action is to provide an initially rich mixture in the burner at the beginning of the suction effect and for a period afterward which not only facilitates ignition in the burner but also provides an excess of fuel in the burner products, this being because the burner mixture contains more fuel than there is air to satisfy it, i. e., is over-rich. The effect of admitting such over-rich and partially burned burner products to the intake passage (assuming the carbureter to be set for normal explosive proportions) is to make an extra rich medium flowing to the engine cylinders and is an advantage in starting a cold engine. The analogy may be made to the common practice of richening the carbureter mixture of ordinary automobile engines, now in use, when they are cold or are operated in cold weather.

The well 52 may be open at its top, but is here shown as closed and vented by tube 55 to the air space in the carbureter receptacle above the liquid therein, such space having the usual vent to atmosphere not shown. In this as in other forms it is preferred that the air valve 44 be designed not to close completely, when seated, a slight leakage being desirable.

Fig. 6 shows still another method of admitting burned products, either as completely or partially burner products, to the carbureter mixture. In this case the intake pipe 1 is formed as a Venturi tube between throttle 60 and the engine and passes through the casing of the burner with an annular crevice 56 at its throat within the casing constituting an entrance to the intake which is adjustable as to area by means of screw-threads 57. The reduction of internal pressure, which is characteristic of flow through venturis, augments the suction effect through entrance 56 in proportion to the flow velocity of the unignited mixture and tends to deliver a larger proportion of burner products at full engine charges than would otherwise be the case. It also improves the mixing of the ignited with the unignited mixtures. The fuel nozzle 58 in this form of burner is vertical and transverse to the air jet 59 which is merely a hole drilled in the end of the interior air-distributing shell. If the longitudinal dimension of this burner is sufficiently long, the flame therein will terminate prior to its arrival at the crevice and all the fuel will be burned. If made shorter, the flame will be extinguished by the velocity effect through the crevice as in the case of Fig. 4 above described and the action will correspond thereto. The length of the flame depends upon the sizes of the fuel and air entrances and the pressure difference acting through them and also upon the adjustments, so that definite dimensions cannot be prescribed, but will be readily ascertained.

For convenience of application and other reasons which will appear below, it is generally preferred to vary the delivery of burner products or ignited mixture substantially in an inverse ratio to the rate of delivery of the unignited mixture and on this account the forms of apparatus above described show the suction burner opening into the intake passage above or on the inside, or engine side, of the throttle. The suction or vacuum condition obtaining at this point is of maximum value when the throttle is set to its partially closed or idling position and in most cases diminishes as the throttle is opened and notwithstanding that the engine may increase its speed as the result of throttle opening, so that unless an individual burner control member is provided (after the manner of valve 25 in Fig. 3) the delivery of burner products will diminish as the delivery of unignited or carbureter mixture increases. This I find generally satisfactory with present-day automotive fuels, even though the burner should entirely cease its function as a combustion device when the engine is taking maximum fuel charges and the throttle is wide open or nearly so. At such times, the burner may go out as the result of diminished suction and insufficient spraying effect within it, and it may then deliver only a small amount of unignited mixture as a contribution to the mixture from the carbureter. I have devised various mechanical means for controlling the delivery of the ignited mixture, one of which is represented by the screw-controlled crevice of Fig. 6 and another by the valve 25 of Fig. 3 used without the interlocking device, and these and other forms of control apparatus constitute the subjects of copending applications. In all cases the proportions of fuel and air admitted to the burner are definitely controlled by the valve settings, relative proportions, or other suitable inter-relation of their respective passages so that the combustion and the delivery of flame or flame products to the intake are continuous throughout the flame-producing period, which period as above pointed out, may include the whole time the engine is in operation or only a portion thereof. Preferably for general efficiency and cleanliness the fuel and air proportions are always maintained substantially constant.

When the character of the fuel requires it, the delivery of the ignited mixture may also be non-variable or may vary directly as to the delivery of the unignited mixture, conditions which are most readily obtained by connecting the suction burner outside the throttle, so that it experiences the same degree of suction or vacuum that affects the carbureter proper. This arrangement is shown in Figs. 7 and 8, as to which it should be noted that although the burner and the carbureter are both controlled primarily by a single throttle and may both be incorporated in a single structure, their functions are distinct as before, each producing a mixture mixed directly with the mixture from the other, and which is accomplished by the location of the burner outlet at any point between the primary spray source of the carbureter and the engine.

In Fig. 7 the suction burner is connected to the carbureter between the throttle 62 and the fuel spray entrance 61, which latter is carried by the gravity-seated air valve 63 of a well-known type. The burner connection is in this case through a series of holes as indicated in the elbow passage and the aggregate area of these holes makes a burner outlet larger than used when the burner is connected inside the throttle. In this form the delivery of the burner products is proportional to the suction effect in the passage which is substantially constant throughout varying deliveries of unignited mixtures. The mixture of the burner is, in this case, mixed with the fully proportioned unignited mixture of the carbureter.

In Fig. 8, the same general type of suction burner admits its ignited mixture through a crevice 64, directly into the spray mixture of a carbureter having an auxiliary or secondary air entrance 65 and between the source of said mixture and said entrance.

In this type of carbureter fuel liquid from the jet 67, adjusted by needle 70, is induced by the suction flow of air from the primary air entrance 68 through the usual choke or Venturi tube 69, and such spray mixture is commonly adjusted to be of correct proportions for operating the engine only when idling, without auxiliary air. It increases in fuel richness as the throttle is opened, and simultaneously the secondary air entrance opens in compensation, as will be well understood. The particular carbureter shown in this figure is merely illustrative of the type having a secondary air entrance and many others are known to the trade. It is to be noted that the burner products are admitted to the carbureter mixture where it may not be fully proportioned, but the general effect and advantages will be as described above for other methods of combining the two mixtures. Inasmuch as the burner in this form is subject to the same suction effect as the fuel nozzle of the carbureter the rate of delivery of burner products will vary directly with the unignited mixture except as some individual control is provided to modify it and, as above stated, various means may be adopted for this purpose, or it may be done entirely by hand by utilizing a valve or shut-off of the kind already referred to, and it will be understood that the character or extent of the combustion taking place in the burner of Fig. 8 as well as in that of Fig. 7 may be controlled in the same manner as already described, that is to say, a flame restrictor such as described in connection with Fig. 4 or the over-rich provisions of Fig. 5 may be applied to the suction burners of both these figures, as a means of controlling the character of the combustion therein.

In carrying out the method of this invention in any of its forms, it is important when starting the engine that the suction effect extended to the burner be of adequate value to give instant ignition therein, this being of particular importance where spark ignition of a cold spray is relied on, and where the cranking of the engine is not vigorously performed. To assure ignition in the case of Figs. 1 to 6, the full or at least an adequate suction effect may be exerted in the burner by simply shutting off the carbureter connection as by closing or partly closing the throttle. In the other forms, it is accomplished by equivalent means represented by the air valves controlling the entrance of air to the carbureter. It is likewise desirable to insure immediate delivery of carbureter mixture, once the burner has started, and this may be accomplished by momentarily choking the air entrance to the burner or the outlet therefrom, or in any way to insure coincident deliveries of both ignited and unignited mixtures. It will be apparent that the spark plug must be energized when the suction effect of the rotating engine is extended to the burner, and this may be conveniently accomplished by connecting the plug in series with one of the cylinder spark plugs, where a separate magneto, as shown in Fig. 1, is not used, or the ordinary distributer head of the engine may be supplied with a special breaker contact to serve the burner plug.

Claims.

1. The method of operating internal combustion engines which consists in causing the suction effect of the rotating engine to cause the flow of mixture of liquid fuel and air coincidently from two separate localities, while controlling the proportions of the mixture from each locality, igniting the mixture from one of said localities, commingling the ignited with the unignited mixture in transit to the engine and running the engine on the commingled medium.

2. The method of operating internal combustion engines which consists in causing the suction effect of the rotating engine to originate a mixture of liquid fuel and air, coincidently causing such suction effect to originate in another locality another mixture of fuel and air and in the proportions of an explosive mixture, igniting and establishing combustion of the latter mixture, commingling the ignited and unignited mixtures and delivering them to the engine.

3. The method of operating internal combustion engines which consists in causing the suction effect of the rotating engine to produce two mixtures of fuel spray and air in different localities, igniting and maintaining in non-explosive combustion one of said mixtures, mixing the latter mixture with the other mixture and delivering the resulting mixture for combustion in the engine.

4. The method of operating internal combustion engines on liquid fuel which consists in creating two mixtures of fuel and air in controlled proportions, igniting one of said mixtures and commingling it with the other, to produce a medium for combustion in the engine, varying the delivery of said medium in accordance with the load and speed demands of the engine and varying the proportion of ignited mixture in said medium inversely to the delivery of the unignited mixture.

5. The method of operating internal combustion engines on liquid fuel which consists in delivering a mixture of fuel liquid and air to the engine intake and coincidently admitting flame into contact with said mixture.

6. The method of operating internal combustion engines which consists in delivering to the engine intake a mixture of liquid fuel spray and air in the proportions of an explosive mixture and coincidently mixing flame with said mixture without inflaming the same.

7. The method of operating internal combustion engines which consists in creating a suction effect by cranking the engine, utilizing such effect to draw in to a passage leading to the engine, a mixture in predetermined proportions of fuel and air, igniting such mixture, admitting the same to the engine cylinders while cranking, and continuing admission of the ignited mixture together with unignited mixture when the engine is running on its own combustion.

8. The method of operating combustion engines which consists in utilizing the suction effect of the rotating engine to create a liquid fuel spray and an inflow of combustion supporting air therefor, igniting the spray prior to its homogeneous mixture with the said air, thereby avoiding explosive combustion, admixing the products of such combustion with a mixture of unignited fuel and air and delivering the resulting medium to the engine cylinders.

9. The method of operating engines which consists in causing the suction effect of the rotating engine to cause the flow of a mixture of fuel and air from two localities, igniting the mixture from one locality and admitting it to opposite sides of the mixture flow from the other locality so as to commingle quickly therewith and running the engine on the commingled medium.

10. The method of operating internal combustion engines which consists in causing the suction of the rotating engine to cause the flow of a mixture of liquid fuel and air from two localities, controlling the proportions of the mixture from one locality so that it is initially relatively rich in liquid fuel and later less rich, igniting said mixture while relatively rich, commingling the ignited mixture with the mixture from the other locality and admitting the commingled medium to the engine.

11. The method of improving the operation of a carbureter-type engine which consists in coincidently operating the carbureter and a suction burner by the suction in the engine intake passage, and controlling the admission of liquid fuel and air to the burner so that they maintain a continuous flame throughout variation of the intake suction.

12. The method of operating internal combustion engines which consists in causing the engine suction to cause the flow of a mixture of liquid fuel and air from separate localities, igniting and maintaining the mixture from one locality in proportions adapting it to burn without appreciable excess of fuel or air in its combustion products, commingling such products with the mixture from the other locality and running the engine on the commingled medium.

13. The method of improving the operation of carbureter-type engines, which consists in operating a liquid fuel burner by the suction existing in the intake of the engine between the engine and its controlling throttle, coincidently controlling the proportions of liquid fuel and air admitted to the burner so as to maintain the same in non-explosive combustion and commingling the burner products with the mixture produced by the carbureter.

14. The method of operating internal combustion engines which consists in utilizing the suction effect of the rotating engine to cause the flow of a mixture of fuel and air coincidently from each of two different localities, igniting and maintaining in combustion one of said mixtures, commingling the flame of such combustion with the other mixture and conducting the resulting commingled medium to the engine and running the same thereon.

15. The method of starting an internal combustion engine on relatively non-inflammable motor fuel which consists in cranking the engine, causing the suction effect resulting therefrom to operate a carbureter and thereby produce an engine-operating mixture of said fuel and air, coincidently causing said suction to start a flow of a spark-ignitible mixture of the same kind of fuel and air, igniting and maintaining said mixture flow in combustion during the cranking period, commingling the flame products thereof with the carbureter mixture and thereby heating and vaporizing said carbureter mixture without inflaming the same, and conducting the commingled medium to the engine for operation thereon.

16. The method of operating an internal combustion engine which consists in causing the flow of two mixtures of fuel and air, igniting and maintaining one of said mixtures in non-explosive combustion, commingling the unignited mixture with the hot products resulting from the ignition of the other mixture, whereby the heat of combustion of the one mixture vaporizes the liquid fuel in the other without inflaming the same, conducting the commingled medium to the engine, and operating the same thereon.

17. The method of operating an internal combustion engine which consists in utilizing the suction effect of the engine to cause a mixture flow of fuel and air through two adjacent passages in heat-exchanging relation, maintaining non-explosive combustion of the mixture in one of said passages, whereby heat is transferred to the other passage, then commingling the mixture flow from both passages, whereby one mixture is further heated by contact with the hot products of the other, and conducting the commingled medium to the engine and operating it thereon.

In testimony whereof I have signed this specification.

JOHN GOOD.